(12) United States Patent
Yamazaki

(10) Patent No.: US 6,966,943 B2
(45) Date of Patent: Nov. 22, 2005

(54) INK SET FOR INK-JET RECORDING AND INK-JET RECORDING METHOD

(75) Inventor: Hideto Yamazaki, Nagoya (JP)

(73) Assignee: Brother Kogyo Kabushiki, Nagoya (JP)

( * ) Notice: Subject to any disclaimer, the term of this patent is extended or adjusted under 35 U.S.C. 154(b) by 70 days.

(21) Appl. No.: 10/385,709

(22) Filed: Mar. 12, 2003

(65) Prior Publication Data

US 2003/0177942 A1 Sep. 25, 2003

(30) Foreign Application Priority Data

Mar. 13, 2002 (JP) ........................................ 2002-069146

(51) Int. Cl.⁷ .............................. C09D 11/02; B41J 2/01
(52) U.S. Cl. ................ 106/31.27; 106/31.6; 106/31.58; 106/31.86; 347/100
(58) Field of Search ............................ 106/31.27, 31.6, 106/31.58, 31.86; 347/100

(56) References Cited

U.S. PATENT DOCUMENTS

| 5,016,028 | A | | 5/1991 | Temple ......................... 347/69 |
| 5,830,264 | A | * | 11/1998 | Fujioka et al. ............ 106/31.43 |
| 5,868,823 | A | * | 2/1999 | Yamazaki et al. ........ 106/31.58 |
| 6,679,598 | B2 | * | 1/2004 | Kato et al. ................... 347/100 |
| 6,783,222 | B2 | * | 8/2004 | Kato et al. ................... 347/100 |
| 2003/0177940 | A1 | * | 9/2003 | Fujioka et al. .............. 106/31.6 |
| 2003/0179268 | A1 | * | 9/2003 | Koga et al. .................. 347/100 |
| 2003/0193555 | A1 | * | 10/2003 | Koga et al. .................. 347/100 |

FOREIGN PATENT DOCUMENTS

| JP | A 6-157956 | 6/1994 |
| JP | B2 2666087 | 6/1997 |
| JP | A 10-95941 | 4/1998 |
| JP | A 10-158551 | 6/1998 |
| JP | A 10-158559 | 6/1998 |

* cited by examiner

Primary Examiner—Helene Klemanski
(74) Attorney, Agent, or Firm—Oliff & Berridge, PLC

(57) ABSTRACT

An ink set for ink-jet recording includes two or more inks each of which contains water, a coloring agent, and a water-soluble organic solvent. The ink set is prepared so that a ratio (Vmin/Vmax) between a maximum permeation velocity Vmax of the ink and a minimum permeation velocity Vmin of the ink is not less than 0.6 when the respective inks are developed by means of paper chromatography on a certain paper. It is possible to suppress the bleeding of a formed image.

12 Claims, 3 Drawing Sheets

INK SET FOR INK-JET RECORDING AND INK-JET RECORDING METHOD

BACKGROUND OF THE INVENTION

1. Field of the Invention

The present invention relates to an ink set for ink-jet recording, an ink-jet recording apparatus which accommodates the same, and a method for producing the ink set.

2. Related Art

In the ink-jet recording system, ink droplets are formed by using a variety of ink discharge methods including, for example, the electrostatic attraction method, the method in which mechanical vibration or displacement is applied to the ink by using a piezoelectric element, and the method in which bubbles are generated by heating the ink to utilize the pressure generated thereby, and all or a part of the ink droplets are adhered to an objective recording material such as paper to perform the recording.

Those known as the ink for ink-jet recording to be used for the ink-jet recording system as described above include those obtained by dissolving or dispersing water-soluble dyes or pigments in water or a liquid medium composed of water and a water-soluble organic solvent. When the water-soluble dye and the pigment are compared with each other, then the water-soluble dye is inferior in water resistance as the water-soluble dye is completely dissolved in the ink medium, and the water-soluble dye is fairly inferior in weather resistance as well in view of the chemical structure thereof. On the contrary, the pigment is extremely satisfactory in weather resistance such as water resistance as the pigment is dispersed to prepare the ink because the pigment is not dissolved in the ink medium. Therefore, in recent years, the change progressively occurs such that the pigment ink is dominantly used as the ink for ink-jet recording rather than the dye ink.

It is required for the ink for ink-jet recording that the ink for ink-jet recording has the most appropriate performance characteristics to be used for the ink-jet recording method. Specifically, for example, the following features are required. That is, the printing quality is satisfactory, and neither precipitation nor aggregation is caused even when the ink for ink-jet recording is not used for a long period of time. No clog-up occurs in the ink flow passage or at the tip of the head of the ink-jet printer, and the ink for ink-jet recording is excellent in weather resistance.

Recently, it is demanded to obtain a printing quality equivalent to that of the picture image, for which a variety of improvements have been made in order to suppress the blur at the boundary between different colors, i.e., the so-called bleeding. For example, Japanese Patent Application Laid-open No. 10-95941 discloses a technique in which glycol-based butyl ether, which is represented by triethylene glycol monobutyl ether, is used as a permeating agent for a water base ink. It is considered that the glycol-based butyl ether has an effect to suppress the bleeding, because the velocity of permeation of the glycol-based butyl ether into the paper is faster than those of surfactants or the like which are commonly used permeating agents. On the other hand, when the glycol-based butyl ether is added in an amount necessary to obtain the effect to quicken the permeation velocity into the paper, then the surface tension of the ink for ink-jet recording is lowered, and a function appears to promptly cause the blur on the paper surface as well. Therefore, the effect to suppress the bleeding is not sufficiently obtained.

As described above, the conventional ink for ink-jet recording has involved the following problem. That is, it is impossible to suppress the bleeding sufficiently to such an extent that a printing quality of extremely high image quality, which is equivalent to that of the picture image, is successfully obtained.

SUMMARY OF THE INVENTION

The present invention has been made in order to solve the problems involved in the conventional technique as described above, an object of which is to provide an ink set for ink-jet recording, an ink-jet recording apparatus, and a method for producing the ink set which make it possible to obtain a printing quality of extremely high image quality by suppressing the bleeding.

According to a first aspect of the present invention, there is provided an ink set for ink-jet recording including two or more inks which are usable to form a recorded image on paper, wherein:

each of the inks contains a coloring agent, water, and a water-soluble organic solvent; and a ratio (Vmin/Vmax) between a maximum permeation velocity Vmax of the ink and a minimum permeation velocity Vmin of the ink is not less than 0.6 when the maximum and minimum permeation velocities of the inks are determined by developing the inks by means of paper chromatography on a prescribed paper, respectively. When the ratio (Vmin/Vmax) is not less than 0.6, the blur is avoided at the boundary between the inks, because the permeation velocities of the inks are relatively approximate to one another. When the two or more inks include a yellow ink and a black ink, a ratio (Vs/Vb) between Vs and Vb may be not less than 0.75 provided that Vs represents a smaller permeation velocity of a permeation velocity of the yellow ink and a permeation velocity of the black ink, and Vb represents a larger permeation velocity.

According to a second aspect of the present invention, there is provided an ink-jet recording apparatus for forming a recorded image on paper, comprising:

an ink-jet head which jets an ink; and an ink tank which accommodates an ink set, wherein:

the ink set is the ink set for ink-jet recording according to the first aspect of the present invention. When the recording apparatus is used, it is possible to form an image in which the bleeding is scarcely caused. The recording apparatus may comprise a wiper which wipes the ink-jet head, and a purge unit which purges the ink-jet head. The ink tank may be an ink container fixedly provided in the apparatus or an ink cartridge which is replaceable.

According to a third aspect of the present invention, there is provided a method for producing an ink set for ink-jet recording including two or more inks which are usable to form a recorded image on paper, the method comprising:

blending each of the inks with at least a coloring agent, water, and a water-soluble organic solvent so that a ratio (Vmin/Vmax) between a maximum permeation velocity Vmax of the ink and a minimum permeation velocity Vmin of the ink is not less than 0.6 when the maximum and minimum permeation velocities of the inks are determined by developing the inks by means of paper chromatography on a prescribed paper, respectively. The permeation velocities of the respective inks may be controlled by controlling blending amounts of the water-soluble organic solvent such as glycol-based ether to be added to the respective inks. Further, the permeation velocities of the respective inks may be controlled by adding an additive such as a surfactant to an ink raw material.

BRIEF DESCRIPTION OF THE DRAWINGS

An embodiment of the invention will be described in detail with reference to the following figures wherein.

DESCRIPTION OF THE PREFERRED EMBODIMENTS

Figure 1:
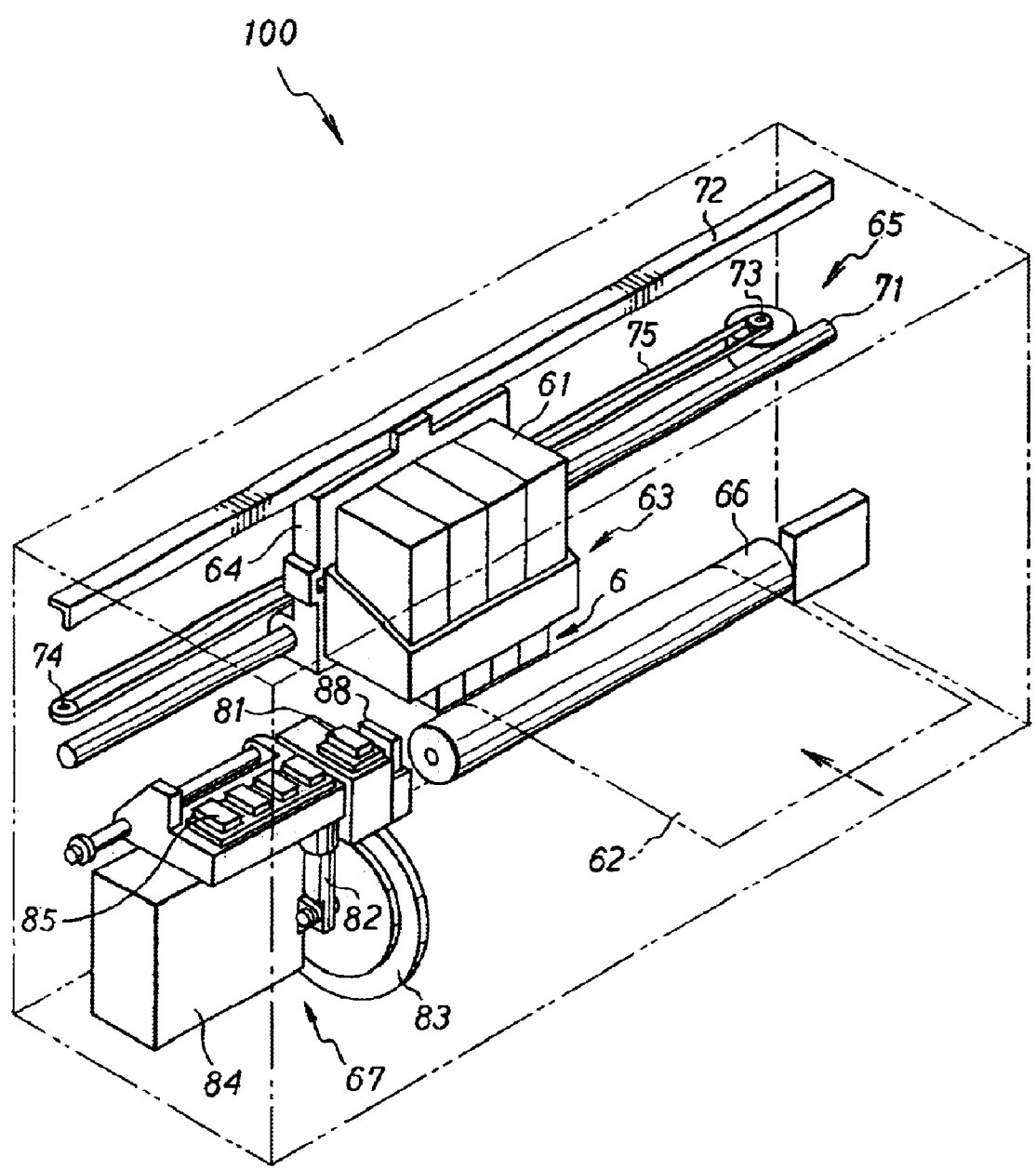
FIG. 1 is a perspective view showing a color ink-jet printer having an ink cartridge which contains ink prepared in examples of the invention.

The ink set for ink-jet recording of the present invention is usable to form a recorded image on the paper by means of the ink-jet recording method. The paper, which is usable for the ink-jet recording, includes, for example, regular paper and recycled paper which come into widespread use in offices and homes. The regular paper is not specifically limited. Those commercially available as the regular paper include, for example, XEROX 4200 paper (available from FUJI XEROX OFFICE SUPPLY), Hammermill Copyplus White paper (available from Hammermill), Mitsubishi PPC paper (available from Mitsubishi Paper Mills, Ltd.), and Canon PB paper (available from Canon Sales Co., Inc.). Those commercially available as the recycled paper include, for example, Recycled PPC paper (available from Taio Paper Mfg. Co., Ltd.) and XEROX Recycled paper (available from FUJI XEROX OFFICE SUPPLY). The prescribed paper, which is used when the permeation velocity ratio is determined by means of the paper chromatography in the present invention, is any one of the four types, i.e., XEROX 4200 paper (available from FUJI XEROX OFFICE SUPPLY), Mitsubishi PPC paper (available from Mitsubishi Paper Mills, Ltd.), XEROX Recycled paper (available from FUJI XEROX OFFICE SUPPLY), and Recycled PPC paper (available from Taio Paper Mfg. Co., Ltd.). That is, in the ink set of the present invention, the permeation velocity ratio (Vmin/Vmax) is not less than 0.6 when the respective permeation velocities of the inks for ink-jet recording are determined by developing the inks for ink-jet recording respectively by means of the paper chromatography by using the prescribed paper of any one of the four types. When the permeation velocity ratio (Vmin/Vmax) is not less than 0.6, then it is possible to remarkably suppress the bleeding, and it is possible to obtain a printing quality of high image quality.

When the ink set for ink-jet recording of the present invention is used, it is possible to obtain an extremely satisfactory printing quality even on the regular paper or on the recycled paper as obtained on the glossy paper which is treated, for example, such that a substance to facilitate the permeation of the ink for ink-jet recording is coated on the surface.

The two or more inks for ink-jet recording are not specifically limited, and they can be arbitrarily selected from inks for ink-jet recording having colors including, for example, yellow, magenta, cyan, black, photo yellow, photo magenta, photo cyan, and photo black. Specifically, for example, there may be exemplified inks for ink-jet recording having four colors of yellow, magenta, cyan, and black.

In the paper chromatography as described above, there is no special limitation for the amount of the ink for ink-jet recording to be used, the size of the prescribed paper, and the development time. These factors may be set in conformity with the convenience of the operator. The permeation velocity Vmax and the permeation velocity Vmin are determined by performing the development by means of the paper chromatography on the prescribed paper by using all of the inks for ink-jet recording for constituting the ink set for ink-jet recording of the present invention to measure the permeation velocities V, and comparing the respective permeation velocities of the inks for ink-jet recording. The permeation velocity V is determined by V=L/T provided that T represents the development time and L represents the development distance from the lowermost point of the paper on the side on which the paper is immersed in the ink for ink-jet recording to the tip to which the solvent component of the ink for ink-jet recording is developed. In this procedure, there is no special limitation for the units to be used for the development distance L and the development time T. These factors may be set in conformity with the convenience of the operator.

It is preferable that the ink set for ink-jet recording of the present invention contains the yellow ink and the black ink, and the ratio between Vs and Vb (Vs/Vb) is not less than 0.75 when the yellow ink and the black ink are developed by means of the paper chromatography respectively on the prescribed paper to determine the respective permeation velocities, Vs represents the smaller permeation velocity of the permeation velocity of the yellow ink and the permeation velocity of the black ink, and Vb represents the larger permeation velocity. When the ratio (Vs/Vb) is not less than 0.75, it is possible to suppress the bleeding at the most conspicuous boundary between the yellow ink and the black ink. Therefore, it is possible to obtain a printing quality of extremely high image quality. Especially preferably, in the ink set of the present invention, the permeation velocity ratio (Vmin/Vmax) is not less than 0.9 when the permeation velocities are determined respectively by developing the inks for constituting the ink set respectively on the reference paper by using XEROX 4200 paper (available from FUJI XEROX OFFICE SUPPLY) as the prescribed paper to be used for developing the inks by means of the paper chromatography.

The ink for ink-jet recording, which constitutes the ink set for ink-jet recording of the present invention, is not specifically limited provided that the ink has the characteristics as described above. The ink for ink-jet recording generally contains a coloring agent and a solvent. The coloring agent may be either the dye or the pigment. The dye is not specifically limited, including, for example, water-soluble dyes such as direct dyes, acid dyes, basic dyes, and reactive dyes. In particular, those especially preferred, which satisfy the performance including, for example, vividness, water solubility, stability and weather resistance, specifically include, for example, C. I. Direct Black 17, 19, 32, 51, 71, 108, 146, 154, 168; C. I. Direct Blue 6, 22, 25, 71, 86, 90, 106, 199; C. I. Direct Red 1, 4, 17, 28, 83, 227; C. I. Direct Yellow 12, 24, 26, 86, 98, 132, 142; C. I. Direct Orange 34, 39, 44, 46, 60; C. I. Direct Violet 47, 48; C. I. Direct Brown 109; C. I. Direct Green 59; C. I. Acid Black 2, 7, 24, 26, 31, 52, 63, 112, 118; C. I. Acid Blue 9, 22, 40, 59, 93, 102, 104, 117, 120, 167, 229, 234; C. I. Acid Red 1, 6, 32, 37, 51, 52, 80, 85, 87, 92, 94, 115, 180, 256, 289, 315, 317; C. I. Acid Yellow 11, 17, 23, 25, 29, 42, 61, 71; C. I. Acid Orange 7, 19; C. I. Acid Violet 49; C. I. Basic Black 2; C. I. Basic Blue 1, 3, 5, 7, 9, 24, 25, 26, 28, 29; C. I. Basic Red 1, 2, 9, 12, 13, 14, 37; C. I. Basic Violet 7, 14, 27; and C. I. Food Black 1, 2.

The blending amount of the dye in the ink for ink-jet recording differs depending on a desired printing density and coloration. However, in general, the blending amount of the dye is 0.1 to 20% by weight with respect to the total amount of the ink for ink-jet recording. However, even when the blending amount is 20% by weight, then the ink exhibits the stability, and no precipitate appears.

The pigment is not specifically limited, which may be any one of the inorganic pigment and the organic pigment. Among the pigments as described above, those preferred for the black-and-white recording include, for example, carbon blacks such as furnace black, lamp black, acetylene black, and channel black; metal oxides such as titanium oxide, and organic pigments such as orthonitroaniline black.

Among the pigments as described above, those preferably usable for the color recording include, for example, Toluidine Red, Permanent Carmine FB, Fast Yellow AAA, Disazo Orange PMP, Lake Red C, Brilliant Carmine 6B, Phthalocyanine Blue, Quinacridone Red, Dioxane Violet, Victoria Pure Blue, Alkaline Blue Toner, Fast Yellow 10G, Disazo Yellow AAOT, Disazo Yellow AAMX, Disazo Yellow HR, Disazo Yellow AAOA, Yellow Iron Oxide, Orthonitroaniline Orange, Dinitroaniline Orange, Vulcan Orange, Toluidine Red, Chlorinated Para Red, Brilliant Fast Scarlet, Naphthol Red 23, Pyrazolone Red, Barium Red 2B, Calcium Red 2B, Strontium Red 2B, Manganese Red 2B, Barium Lissome Red, Pigment Scarlet 3B Lake, Lake Bordeaux 10B, Anthosin 3B Lake, Anthosin 5B Lake, Rhodamine 6G Lake, Eosin Lake, red iron oxide, Naphthol Red FGR, Rhodamine B Lake, Methyl Violet Lake, Dioxazine Violet, Basic Blue 5B Lake, Basic Blue 6G Lake, Fast Sky Blue, Alkaline Blue R Toner, Peacock Blue Lake, indigo blue, navy blue, Reflex Blue 2G, Reflex Blue R, Brilliant Green Lake, Diamond Green Thioflavine Lake, Phthalocyanine Green G, Green Gold, Phthalocyanine Green Y, iron oxide, rust powder, zinc oxide, titanium oxide, calcium carbonate, clay, barium sulfate, alumina white, aluminum, bronze, daylight fluorescent pigment, pearl pigment, Naphthol Carmine FB, Naphthol Red M, Permanent Carmine FB, Fast Yellow G, Disazo Yellow AAA, Alkaline Blue G Toner, and surface-modified pigments obtained by treating the surface of the pigment with a specified functional group.

The blending amount of the pigment in the ink for ink-jet recording differs depending on a desired printing density and coloration. However, the blending amount is generally 1 to 20% by weight and preferably 1 to 15% by weight with respect to the total amount of the ink for ink-jet recording. Even when the blending amount is not more than 10% by weight, it is possible to obtain the sufficient coloring force and the high vividness.

A dispersing agent may be optionally added to the water base ink for ink-jet recording, when the ink contains the pigment. The dispersing agent is not specifically limited. However, it is preferable to use, for example, high molecular weight polyurethane; polyester; and high molecular weight copolymer containing a functional group having strong affinity to the pigment including, for example carbonyl group and amino group.

The solvent is not specifically limited. For example, a mixed solvent composed of water and the water-soluble organic solvent is preferably used. It is preferable that deionized water is used as the water rather than ordinary water containing various ions. The blending amount of the water in the ink for ink-jet recording is determined within a wide range depending on the type and the composition of the water-soluble organic solvent and desired characteristics of the ink for ink-jet recording. However, the blending amount is generally 10 to 95% by weight, preferably 10 to 70% by weight, and more preferably 20 to 70% by weight with respect to the total amount of the ink for ink-jet recording.

The water-soluble organic solvent is principally classified into those which have the effect to prevent the ink for ink-jet recording from drying at the tip of the ink-jet head and those which accelerate the drying velocity on the paper surface. The water-soluble organic solvent, which has the effect to prevent the ink for ink-jet recording from drying, is not specifically limited, including, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones or ketone alcohols such as acetone and diacetone alcohol; ethers such as tetrahydrofuran and dioxane; polyalkylene glycols such as polyethylene glycol and polypropylene glycol; alkylene glycols such as ethylene glycol, propylene glycol, butylene glycol, diethylene glycol, triethylene glycol, dipropylene glycol, tripropylene glycol, thiodiglycol, and hexylene glycol; glycerol; 2-pyrrolidone; N-methyl-2-pyrrolidone; and 1,3-dimethyl-2-imidazolidinone. In particular, it is preferable to use polyvalent alcohols such as alkylene glycols and glycerol.

The blending amount of the water-soluble organic solvent having the effect to prevent the ink from drying in the ink for ink-jet recording is generally 0 to 95% by weight, preferably 10 to 80% by weight, and more preferably 10 to 50% by weight with respect to the total amount of the ink for ink-jet recording.

The water-soluble organic solvent, which quicken the drying velocity on the paper surface, is not specifically limited, including, for example, glycol-based ethers such as ethylene glycol monomethyl ether, ethylene glycol monoethyl ether, ethylene glycol monopropyl ether, diethylene glycol monomethyl ether, diethylene glycol monoethyl ether, diethylene glycol monopropyl ether, triethylene glycol monomethyl ether, triethylene glycol monoethyl ether, triethylene glycol monopropyl ether, propylene glycol monomethyl ether, propylene glycol monoethyl ether, propylene glycol monopropyl ether, dipropylene glycol monomethyl ether, dipropylene glycol monoethyl ether, dipropylene glycol monopropyl ether, tripropylene glycol monomethyl ether, tripropylene glycol monoethyl ether, and tripropylene glycol monopropyl ether.

The blending amount of the water-soluble organic solvent for quickening the drying velocity on the paper surface in the ink for ink-jet recording is generally 0 to 20% by weight, preferably 0.1 to 15% by weight, and more preferably 1 to 10% by weight with respect to the total amount of the ink for ink-jet recording. If the blending amount is excessively large, then the permeability of the ink for ink-jet recording into the paper is too high, and any blur may be caused in some cases.

Further, if necessary, the water base ink for ink-jet recording may contain conventionally known additives such as viscosity-adjusting agents, surface tension-adjusting agents, and fungicidal agents. The viscosity-adjusting agent is not specifically limited, including, for example, polyvinyl alcohol, cellulose, and water-soluble resin.

In the ink set for ink-jet recording of the present invention, the ratio (Vmin/Vmax) between the permeation velocity Vmax of the ink for ink-jet recording which exhibits the maximum permeation velocity and the permeation velocity Vmin of the ink for ink-jet recording which exhibits the minimum permeation velocity is not less than 0.6 when the permeation velocities of the respective inks for ink-jet recording are determined by developing the inks for ink-jet recording by means of the paper chromatography on the paper respectively. Accordingly, when a recorded image is formed on the paper, then it is possible to suppress the bleeding, and it is possible to obtain a printing quality of extremely high image quality. The method for producing the ink set for ink-jet recording of the present invention and the ink-jet recording apparatus which accommodates the ink set for ink-jet recording of the present invention also belong to the present invention.

In order that the permeation velocity ratio (Vmin/Vmax) of the inks for constituting the ink set is not less than 0.6 according to the present invention, the blending amounts and the components of the respective inks are appropriately controlled. In particular, the permeation velocity is affected by the blending amount of the water-soluble organic solvent as described above. It is generally acknowledged, for example, that the permeation velocity of the ink is quickened by increasing the blending amount of the water-soluble organic solvent, especially the glycol-based ether. It is also acknowledged that the permeation velocity of the ink can be controlled by adding the surfactant. It is possible to achieve the permeation velocity ratio (Vmin/Vmax) of not less than 0.6 by controlling the permeation velocities of the respective inks for constituting the ink set by means of the method as described above.

EXAMPLES

The present invention will be explained in further detail below as exemplified by Examples. However, the present invention is not limited to only Examples.

Preparation of Ink Set 1

An ink solvent was prepared by mixing and agitating, for 10 minutes, 34.8 parts by weight of pure water, 30 parts by weight of glycerol, 5 parts by weight of diethylene glycol monoethyl ether, and 0.2 part by weight of a nonionic surfactant (trade name: Naloacty 100, produced by Sanyo Chemical Industries, Ltd.). 30 parts by weight of a yellow pigment dispersion (trade name: FUJI SP YELLOW 4254, produced by Fuji Pigment Co., Ltd.) was added to the ink solvent to perform agitation for 30 minutes, followed by being filtrated with a membrane filter having a pore size of 1 $\mu$m to obtain a yellow ink Y1.

An ink solvent was prepared by mixing and agitating, for 10 minutes, 38 parts by weight of pure water, 20 parts by weight of glycerol, 10 parts by weight of 2-pyrrolidone, and 2 parts by weight of dipropylene glycol monopropyl ether. 30 parts by weight of a magenta pigment dispersion (trade name: FUJI SP MAGENTA 9345, produced by Fuji Pigment Co., Ltd.) was added to the ink solvent to perform agitation for 30 minutes, followed by being filtrated with a membrane filter having a pore size of 1 $\mu$m to obtain a magenta ink M1.

An ink solvent was prepared by mixing and agitating, for 10 minutes, 38.7 parts by weight of pure water, 25 parts by weight of glycerol, 5 parts by weight of dipropylene glycol, and 1.3 parts by weight of dipropylene glycol monopropyl ether. 30 parts by weight of a cyan pigment dispersion (trade name: FUJI SP BLUE 6447, produced by Fuji Pigment Co., Ltd.) was added to the ink solvent to perform agitation for 30 minutes, followed by being filtrated with a membrane filter having a pore size of 1 $\mu$m to obtain a cyan ink C1.

An ink solvent was prepared by mixing and agitating, for 10 minutes, 34.4 parts by weight of pure water, 30 parts by weight of glycerol, and 5.6 parts by weight of tripropylene glycol monomethyl ether. 30 parts by weight of a black pigment dispersion (trade name: FUJI SP BLACK 8796, produced by Fuji Pigment Co., Ltd.) was added to the ink solvent to perform agitation for 30 minutes, followed by being filtrated with a membrane filter having a pore size of 1 $\mu$m to obtain a black ink K1.

Preparation of Ink Set 2

The yellow ink Y1 and the cyan ink C1, which were prepared for the ink set for ink-jet recording 1, were used as a yellow ink Y2 and a cyan ink C2 as they were.

An ink solvent was prepared by mixing and agitating, for 10 minutes, 38 parts by weight of pure water, 18 parts by weight of glycerol, 10 parts by weight of 2-pyrrolidone, and 4 parts by weight of dipropylene glycol monopropyl ether. 30 parts by weight of a magenta pigment dispersion (trade name: FUJI SP MAGENTA 9345, produced by Fuji Pigment Co., Ltd.) was added to the ink solvent to perform agitation for 30 minutes, followed by being filtrated with a membrane filter having a pore size of 1 $\mu$m to obtain a magenta ink M2.

An ink solvent was prepared by mixing and agitating, for 10 minutes, 34 parts by weight of pure water, 26 parts by weight of glycerol, and 10 parts by weight of tripropylene glycol monomethyl ether. 30 parts by weight of a black pigment dispersion (trade name: FUJI SP BLACK 8796, produced by Fuji Pigment Co., Ltd.) was added to the ink solvent to perform agitation for 30 minutes, followed by being filtrated with a membrane filter having a pore size of 1 $\mu$m to obtain a black ink K2.

Preparation of Ink Set 3

57.8 parts by weight of pure water, 35 parts by weight of glycerol, 5 parts by weight of diethylene glycol monoethyl ether, 0.2 part by weight of a nonionic surfactant (trade name: Naloacty 100, produced by Sanyo Chemical Industries, Ltd.), and 2 parts by weight of Color Index No. Direct Yellow 132 were added to perform agitation for 30 minutes, followed by being filtrated with a membrane filter having a pore size of 0.7 $\mu$m to obtain a yellow ink Y3.

61.5 parts by weight of pure water, 25 parts by weight of glycerol, 10 parts by weight of 2-pyrrolidone, 2 parts by weight of dipropylene glycol monopropyl ether, and 1.5 parts by weight of Color Index No. Acid Red 92 were added to perform agitation for 30 minutes, followed by being filtrated with a membrane filter having a pore size of 0.7 $\mu$m to obtain a magenta ink M3.

61.7 parts by weight of pure water, 30 parts by weight of glycerol, 5 parts by weight of dipropylene glycol, 1.5 parts by weight of dipropylene glycol monopropyl ether, and 1.8 parts by weight of Color Index No. Direct Blue 86 were added to perform agitation for 30 minutes, followed by being filtrated with a membrane filter having a pore size of 0.7 $\mu$m to obtain a cyan ink C3.

56 parts by weight of pure water, 35 parts by weight of glycerol, 6 parts by weight of tripropylene glycol monomethyl ether, and 3 parts by weight of Color Index No. Direct Black 154 were added to perform agitation for 30 minutes, followed by being filtrated with a membrane filter having a pore size of 0.7 $\mu$m to obtain a black ink K3.

Preparation of Ink Set 4

The cyan ink C3, which was prepared for the ink set for ink-jet recording 3, was used as a cyan ink C4 as it was.

61.95 parts by weight of pure water, 35 parts by weight of glycerol, 1 part by weight of diethylene glycol monoethyl ether, 0.05 part by weight of a nonionic surfactant (trade name: Naloacty 100, produced by Sanyo Chemical Industries, Ltd.), and 2 parts by weight of Color Index No. Direct Yellow 132 were added to perform agitation for 30 minutes, followed by being filtrated with a membrane filter having a pore size of 0.7 $\mu$m to obtain a yellow ink Y4.

60.5 parts by weight of pure water, 20 parts by weight of glycerol, 10 parts by weight of 2-pyrrolidone, 8 parts by weight of dipropylene glycol monopropyl ether, and 1.5 parts by weight of Color Index No. Acid Red 92 were added to perform agitation for 30 minutes, followed by being filtrated with a membrane filter having a pore size of 0.7 μm to obtain a magenta ink M4.

57 parts by weight of pure water, 25 parts by weight of glycerol, 15 parts by weight of tripropylene glycol monomethyl ether, and 3 parts by weight of Color Index No. Direct Black 154 were added to perform agitation for 30 minutes, followed by being filtrated with a membrane filter having a pore size of 0.7 μm to obtain a black ink K4.

The compositions of the respective inks for ink-jet recording of the ink sets for ink-jet recording 1 to 4 are shown in Table 1A and Table 1B.

TABLE 1A

| Name of material | Ink set for ink-jet recording 1 | | | | Ink set for ink-jet recording 2 | | | |
|---|---|---|---|---|---|---|---|---|
|  | Y1 | M1 | C1 | K1 | Y2 (Y = 1) | M2 | C2 (C = 1) | K2 |
| Yellow pigment dispersion | 30 | — | — | — | 30 | — | — | — |
| Magenta pigment dispersion | — | 30 | — | — | — | 30 | — | — |
| Cyan pigment dispersion | — | — | 30 | — | — | — | 30 | — |
| Black pigment dispersion | — | — | — | 30 | — | — | — | 30 |
| Direct Yellow 132 | — | — | — | — | — | — | — | — |
| Acid Red 92 | — | — | — | — | — | — | — | — |
| Direct Blue 86 | — | — | — | — | — | — | — | — |
| Direct Black 154 | — | — | — | — | — | — | — | — |
| Glycerol | 30 | 20 | 25 | 30 | 30 | 18 | 25 | 26 |
| 2-Pyrrolidone | — | 10 | — | — | — | 10 | — | — |
| Dipropylene glycol | — | — | 5 | — | — | — | 5 | — |
| Diethylene glycol monoethyl ether | 5 | — | — | — | 5 | — | — | — |
| Dipropylene glycol monopropyl ether | — | 2 | 1.3 | — | — | 4 | 1.3 | — |
| Tripropylene glycol monomethyl ether | — | — | — | 5.6 | — | — | — | 10 |
| Nonionic surfactant | 0.2 | — | — | — | 0.2 | — | — | — |
| Pure water | 34.8 | 38 | 38.7 | 34.4 | 34.8 | 38 | 38.7 | 34 |

(parts by weight)

TABLE 1B

| Name of material | Ink set for ink-jet recording 3 | | | | Ink set for ink-jet recording 4 | | | |
|---|---|---|---|---|---|---|---|---|
|  | Y3 | M3 | C3 | K3 | Y4 | M4 | C4 (C = 3) | K4 |
| Yellow pigment dispersion | — | — | — | — | — | — | — | — |
| Magenta pigment dispersion | — | — | — | — | — | — | — | — |
| Cyan pigment dispersion | — | — | — | — | — | — | — | — |
| Black pigment dispersion | — | — | — | — | — | — | — | — |
| Direct Yellow 132 | 2 | — | — | — | 2 | — | — | — |
| Acid Red 92 | — | 1.5 | — | — | — | 1.5 | — | — |
| Direct Blue 86 | — | — | 1.8 | — | — | — | 1.8 | — |
| Direct Black 154 | — | — | — | 3 | — | — | — | 3 |
| Glycerol | 35 | 25 | 30 | 35 | 35 | 20 | 30 | 25 |
| 2-Pyrrolidone | — | 10 | — | — | — | 10 | — | — |
| Dipropylene glycol | — | — | 5 | — | — | — | 5 | — |
| Diethylene glycol monoethyl ether | 5 | — | — | — | 1 | — | — | — |
| Dipropylene glycol monopropyl ether | — | 2 | 1.5 | — | — | 8 | 1.5 | — |
| Tripropylene glycol monomethyl ether | — | — | — | 6 | — | — | — | 15 |
| Nonionic surfactant | 0.2 | — | — | — | 0.05 | — | — | — |
| Pure water | 57.8 | 61.5 | 61.7 | 56 | 61.95 | 60.5 | 61.7 | 57 |

(parts by weight)

EVALUATION

The ink sets for ink-jet recording 1 to 4 were evaluated in accordance with the following method.

Each of the inks for ink-jet recording of yellow, magenta, cyan, and black of the ink sets for ink-jet recording, which weighed 2 g, was collected in a glass vessel (No. 5, produced by Iuchi Seieido) respectively. The samples were lidded and they were left to stand stationarily for 5 minutes to saturate the interior of the vessel with the vapor of -the ink solvent of each of the inks for ink-jet recording. Subsequently, XEROX 4200 paper (available from FUJI XEROX OFFICE SUPPLY), Mitsubishi PPC paper (available from Mitsubishi Paper Mills, Ltd.), XEROX Recycled paper (available from FUJI XEROX OFFICE SUPPLY), and Recycled PPC paper (available from Taio Paper Mfg. Co., Ltd.), each of which was cut to have a size of length: 40 mm×width: 20 mm, were prepared respectively. Characteristics of XEROX 4200 paper (available from FUJI XEROX OFFICE SUPPLY), Mitsubishi PPC paper (available from Mitsubishi Paper Mills, Ltd.), and XEROX Recycled paper (available from FUJI XEROX OFFICE SUPPLY) included in the four types of paper described above are shown in Table 3 below. The four types of paper sheets were immersed in the inks in the vessels respectively to perform the paper chromatography development. After performing the development for 30 minutes, the respective sheets of paper were taken out of the vessels to mark the tips of the development of the solvent components of the inks for ink-jet recording, followed by being dried with a dryer. The distance, which ranged from the lowermost point of the paper on the side of the immersion in the ink to the tip of the development of the solvent component of the ink for ink-jet recording was designated as L (mm). The permeation velocity V (mm/minute) of the ink solvent was calculated by L/30 for each of the inks for ink-jet recording. The permeation velocity of the ink for ink-jet recording of the permeation velocities of the respective inks for ink-jet recording, which exhibited the maximum permeation velocity, was designated as Vmax, and the permeation velocity of the ink for ink-jet recording, which exhibited the minimum permeation velocity, was designated as Vmin to calculate Vmin/Vmax. The smaller permeation velocity of the permeation velocities of the yellow ink and the black ink was designated as Vs, and the larger permeation velocity was designated as Vb to calculate Vs/Vb.

The ink set for ink-jet recording was carried on an ink-jet head of the shearing mode type disclosed in U.S. Pat. No. 5,016,028 corresponding to Japanese Patent Application Laid-open No. 2-150355, and a photograph image, which had been inputted into a personal computer, was printed to visually confirm the bleeding. A mark of "++" was awarded when the bleeding was completely or almost inconspicuous. A mark of "+" was awarded when the bleeding was not conspicuous so much. A mark of "±" was awarded when the bleeding was conspicuous to some extent. A mark of "−" was awarded when the bleeding was conspicuous.

Results of the evaluation are shown in Table 2.

TABLE 2

|  |  |  | XEROX 4200 paper | Mitsubishi PPC paper | XEROX Recycled paper | Recycled PPC paper |
|---|---|---|---|---|---|---|
| Ink set 1 | V (mm/min) | Y1 | 0.73 | 0.43 | 0.87 | 0.25 |
|  |  | M1 | 0.75 | 0.72 | 0.90 | 0.18 |
|  |  | C1 | 0.75 | 0.44 | 0.87 | 0.15 |
|  |  | K1 | 0.78 | 0.60 | 0.87 | 0.17 |
|  | Vmin/Vmax |  | 0.94 | 0.60 | 0.96 | 0.60 |
|  | Vs/Vb |  | 0.94 | 0.72 | 1.00 | 0.67 |
|  | Bleeding |  | ++ | + | ++ | + |
| Ink set 2 | V (mm/min) | Y2 | 0.73 | 0.43 | 0.87 | 0.25 |
|  |  | M2 | 0.75 | 0.87 | 0.92 | 0.56 |
|  |  | C2 | 0.75 | 0.44 | 0.87 | 0.15 |
|  |  | K2 | 0.78 | 0.72 | 0.87 | 0.53 |
|  | Vmin/Vmax |  | 0.94 | 0.50 | 0.95 | 0.27 |
|  | Vs/Vb |  | 0.94 | 0.60 | 1.00 | 0.47 |
|  | Bleeding |  | ++ | ± | ++ | − |
| Ink set 3 | V (mm/min) | Y3 | 0.73 | 0.43 | 0.87 | 0.25 |
|  |  | M3 | 0.75 | 0.72 | 0.90 | 0.18 |
|  |  | C3 | 0.75 | 0.58 | 0.87 | 0.19 |
|  |  | K3 | 0.79 | 0.62 | 0.88 | 0.21 |
|  | Vmin/Vmax |  | 0.92 | 0.60 | 0.96 | 0.73 |
|  | Vs/Vb |  | 0.92 | 0.70 | 0.99 | 0.83 |
|  | Bleeding |  | ++ | + | ++ | ++ |
| Ink set 4 | V (mm/min) | Y4 | 0.40 | 0.24 | 0.48 | 0.15 |
|  |  | M4 | 0.77 | 0.99 | 0.94 | 0.93 |
|  |  | C4 | 0.75 | 0.58 | 0.87 | 0.19 |
|  |  | K4 | 0.79 | 0.87 | 0.88 | 0.68 |
|  | Vmin/Vmax |  | 0.51 | 0.24 | 0.51 | 0.16 |
|  | Vs/Vb |  | 0.51 | 0.28 | 0.55 | 0.22 |
|  | Bleeding |  | ± | − | ± | − |

According to Table 2, Vmin/vmax was not less than 0.6 in the case of any one of the combinations of the inks for ink-jet recording and the sheets of paper in which the bleeding was suppressed and the printing quality of high image quality was obtained. Further, Vs/Vb was not less than 0.75 in the case of any one of the combinations of the inks for ink-jet recording and the sheets of paper in which the bleeding was remarkably suppressed and the printing quality of extremely high image quality was obtained. On the other hand, the foregoing conditions were not satisfied in any one of the combinations of the inks for ink-jet recording and the sheets of paper in which the bleeding was conspicuous. It is appreciated that Vmin/Vmax is not less than 0.9 in the case of any one of the ink sets 1 to 3 when XEROX 4200 is used.

TABLE 3

|  | Paper Type | | |
|---|---|---|---|
| Characteristics | XEROX 4200 | Mitsubishi PPC | XEROX Recycled |
| Paper Size | Letter | A4 | A4 |
| Basis weight (g/m$^2$) | 75.8 | 65.0 | 67.9 |
| Paper thickness (mm) | 103 | 87 | 100 |
| Density (g/m$^3$) | 0.74 | 0.75 | 0.68 |
| Water absorption | quick | middle | middle |
| Paper surface pH | neutral | neutral | neutral |
| Surface roughness (basis: 4200) | average | low | average |

According to the ink set for ink-jet recording and the ink-jet recording apparatus of the present invention, it is possible to obtain a printing quality of extremely high image quality by suppressing the bleeding.

An embodiment of an ink jet printer as an ink-jet recording apparatus in accordance with the invention will be described as below with reference to the accompanying drawings.

As shown in FIG. 1, a color ink jet printer 100 includes four ink cartridges (ink set) 61, each of which contains a respective color of ink, such as cyan, magenta, yellow and black ink, a head unit 63 having an ink jet printer head 6 (hereinafter referred to as a head 6) for ejecting ink onto a sheet 62, a carriage 64 on which the ink cartridges 61 and the head unit 63 are mounted, a drive unit 65 that reciprocates the carriage 64 in a straight line, a platen roller 66 that extends in a reciprocating direction of the carriage 64 and is disposed opposite to the head 6, and a purge unit 67. As the black, cyan, magenta and yellow ink, the ink set prepared in the above examples can be used.

The drive unit 65 includes a carriage shaft 71, a guide plate 72, two pulleys 73 and 74, and an endless belt 75. The carriage shaft 71 is disposed at a lower end portion of the carriage 64 and extends in parallel with the platen roller 66. The guide plate 72 is disposed at an upper end portion of the carriage 64 and extends in parallel with the carriage shaft 71. The pulleys 73 and 74 are disposed at both end portions of the carriage shaft 71 and between the carriage shaft 71 and the guide plate 72. The endless belt 75 is stretched between the pulleys 73 and 74.

As the pulley 73 is rotated in normal and reverse directions by a motor, the carriage 64, connected to the endless belt 75, is reciprocated in the straight direction, along the carriage shaft 71 and the guide plate 72, in accordance with the normal and reverse rotation of the pulley 73.

The sheet 62 is supplied from a sheet cassette (not shown) provided in the ink jet printer 100 and fed between the head 6 and the platen roller 66 to perform predetermined printing by ink droplets ejected from the head 6. Then, the sheet 62 is discharged to the outside. A sheet feeding mechanism and a sheet discharging mechanism are omitted from FIG. 1.

The purge unit 67 is provided on a side of the platen roller 66. The purge unit 67 is disposed to be opposed to the head 6 when the head unit 63 is located in a reset position. The purge unit 67 includes a purge cap 81, a pump 82, a cam 83, and a waste ink reservoir 84. The purge cap 81 contacts a nozzle surface to cover a plurality of nozzles (described later) formed in the head 6. When the head unit 63 is placed in the reset position, the nozzles in the head 6 are covered with the purge cap 81 to inhale ink including air bubbles trapped in the head 6 by the pump 82 and by the cam 83, thereby purging the head 6. The inhaled ink is stored in the waste ink reservoir 84.

To prevent ink from drying, a cap 85 is provided to cover the nozzles 15 (FIG. 2) in the head 6 mounted on the carriage 64 when it returns to the reset position after printing. The ink jet printer 100 is further provided with a wiper 88 adjacent to the purge cap 81. The wiper 88 wipes the nozzle surface to remove the ink on the surface.

Figure 2:
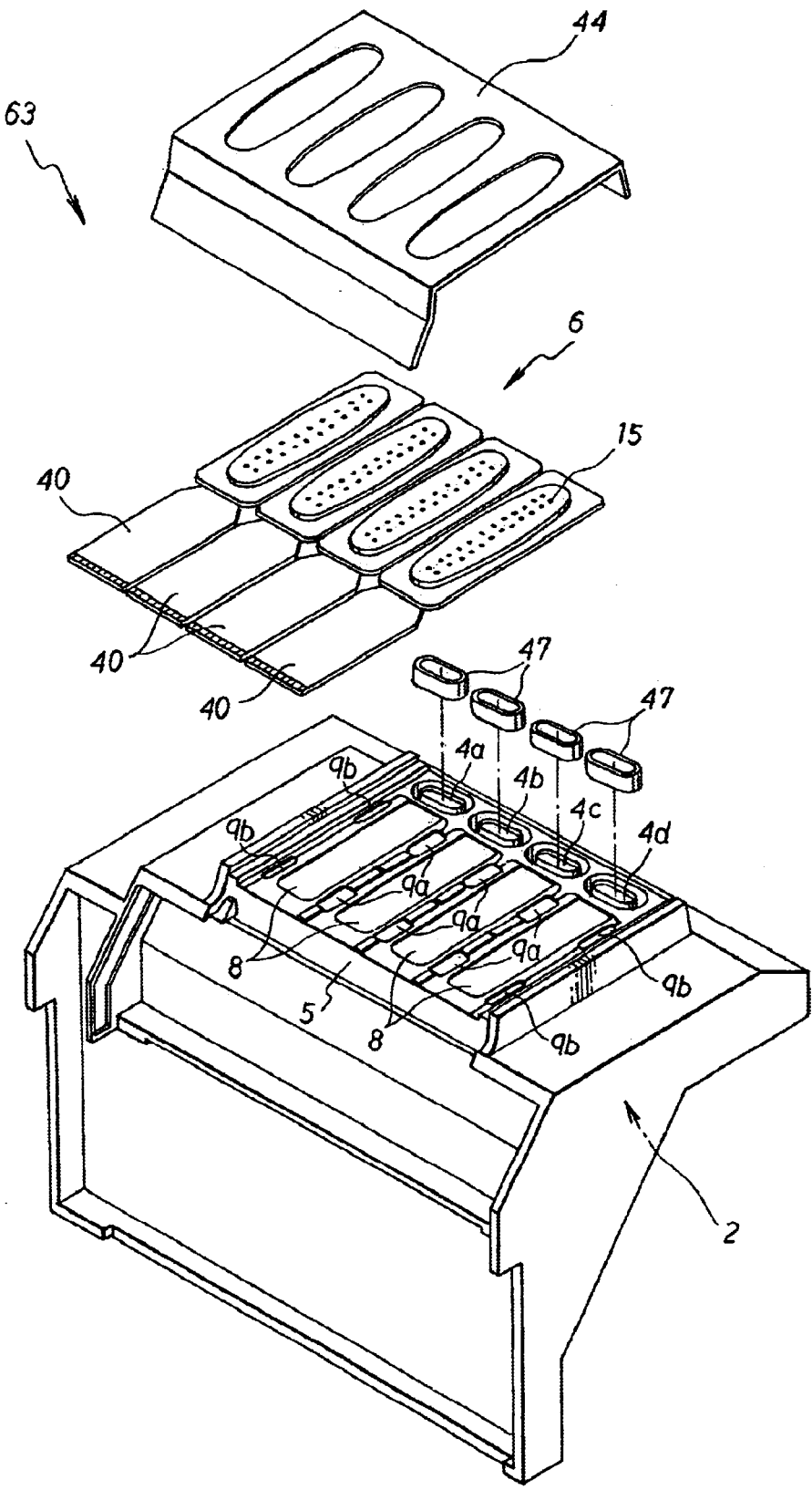
FIG. 2 is a perspective view of a head unit, with its nozzles facing upward.

The head unit 63 is mounted on the carriage 64 that moves along the sheet 62 and has a substantially box shape with upper open structure. As shown in FIG. 2. the head unit 63 has a cover plate 44 made of an elastic thin metallic plate. The cover plate 44 is fixed at the front surface of the head unit 63 and covers the head unit 63 when the head 6 is removed. Flexible cables 40 are connected to an actuator (not shown) of the head 6. The head unit 63 also has a mounting portion 2 on which the four ink cartridges 61 are detachably attached from above. Ink supply paths 4a, 4b, 4c, 4d, each of which connects respective ink discharge portions of each ink cartridge 61, communicate with a bottom of a bottom plate 5 of the head unit 63. Each of the ink supply paths 4a, 4b, 4c, 4d is provided with a rubber packing 47 to intimately contact an ink supply hole 19a.

The head 6 is constructed from four blocks that are arranged in parallel to each other. On the underside of the bottom plate 5, four stepped supports 8 are formed to receive the respective blocks of the head 6. In the bottom plate 5, a plurality of recesses 9a, 9b, which are filled with an UV adhesive to bond the respective blocks of the head 6, are formed to penetrate the bottom plate 5.

Figure 3:
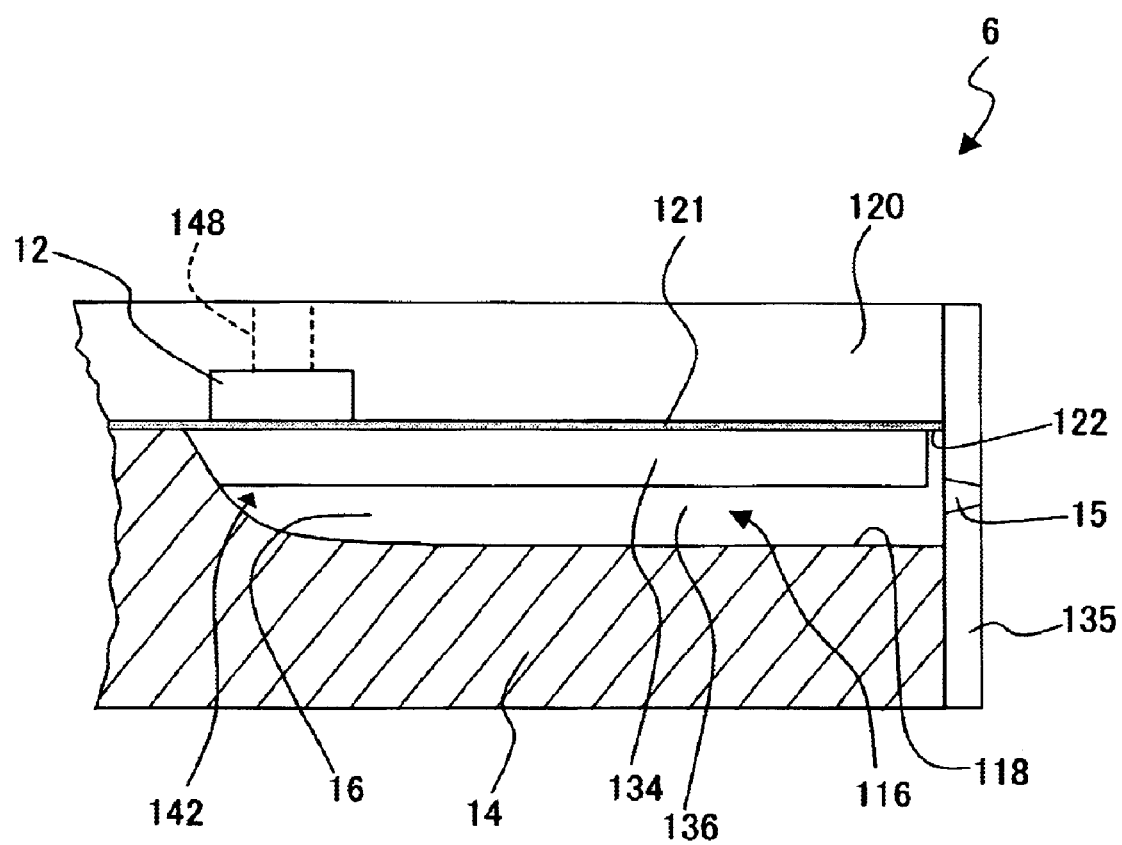
FIG. 3 is a schematic diagram showing the ink jet print head and a controller.

Referring now to FIG. 3, the head 6 has the channels 16 comprising a forward part 136 of uniform depth which is closed at its forward end by a nozzle plate 135 having formed therein a nozzle 15 from which droplets of ink in the channel are expelled by activation of the facing actuator walls 116 of the respective channel. The channel 16 also has a rearward part 142 extending from the tops 122 of walls 116 of lesser depth than the forward part 136. The metalized plating 134, which is on opposed surfaces of the walls 116, preferably occupies a depth approximately one half that of the channel side walls but greater than the depth of the rearward part 142. Therefore, when plating takes place, the side walls 116 and bottom surface 118 of the channel part 142 are fully metalized while the side walls in the forward part 136 of the channel are metalized to approximately one half the channel depth. A suitable electrode metal which may be used for plating is nickel or an alloy of nickel and chromium, i.e. nichrome.

It will be noted that a liquid droplet manifold 12 is formed in the top sheet 120 which is placed transversely to the parallel channels 16, formed in a bottom sheet 14, and on the tops 122 of the walls 116 via a bonding layer 121. Manifold 12 communicates with each of the channels 16 and with a duct 148 which leads to liquid droplet supply.

A controller (not shown) provides a prestored driving pulse to the actuator walls 116 (not shown) by superimposing the driving pulse on a clock signal. The driving pulse can be controlled with a technique disclosed in, for example, U.S. Pat. Nos. 6,312,089, 6,412,923 B1 and 6,760,959. Further, the detailed structure of the printer and controlling method of the head unit are also disclosed in these U.S. patents, a content of which has been incorporated herein by reference. U.S. Pat. No. 5,016,028, which discloses an apparatus having the ink-jet head of the sheaving mode type shown in FIG. 3, has been also incorporated herein by reference.

What is claimed is:

1. An ink set for ink-jet recording including two or more inks which are usable to form a recorded image on paper, wherein:

each of the inks contains a coloring agent, water, and a water-soluble organic solvent; and a ratio (Vmin/Vmax) between a maximum permeation velocity Vmax of the ink, of the two or more inks, which exhibits the maximum permeation velocity and a minimum permeation velocity Vmin of the ink, of the two or more inks, which exhibits the minimum permeation velocity is not less than 0.6 when the maximum and minimum permeation velocities of the inks are determined by developing the inks with paper chromatography on a prescribed paper, respectively.

2. The ink set for ink-jet recording according to claim 1, wherein the two or more inks include a yellow ink and a black ink, and a ratio (Vs/Vb) between Vs and Vb is not less than 0.75 provided that Vs represents a smaller permeation velocity of a permeation velocity of the yellow ink and a permeation velocity of the black ink, and Vb represents a larger permeation velocity.

3. The ink set for ink-jet recording according to claim 1, wherein a surfactant is contained in only one of the ink which exhibits the maximum permeation velocity and the ink which exhibits the minimum permeation velocity.

4. The ink set for ink-jet recording according to claim 1, wherein the ink which exhibits the maximum permeation velocity is a black ink, and the ink which exhibits the minimum permeation velocity is a yellow ink.

5. The ink set for ink-jet recording according to claim 4, wherein the yellow ink contains a nonionic surfactant.

6. The ink set for ink-jet recording according to claim 1, wherein the water-soluble organic solvent is a glycol-based ether.

7. An ink-jet recording apparatus for forming a recorded image on paper, comprising:

an ink-jet head which jets an ink; and an ink tank which accommodates an ink set, wherein:

the ink set is the ink set for ink-jet recording as defined in claim 1.

8. The ink-jet recording apparatus according to claim 7, wherein the two or more inks include a yellow ink and a black ink, and a ratio (Vs/Vb) between Vs and Vb is not less than 0.75 provided that Vs represents a smaller permeation velocity of a permeation velocity of the yellow ink and a permeation velocity of the black ink, and Vb represents a larger permeation velocity.

9. A method for producing an ink set for ink-jet recording including two or more inks which are usable to form a recorded image on paper, the method comprising:

blending each of the inks with at least a coloring agent, water, and a water-soluble organic solvent so that a ratio (Vmin/Vmax) between a maximum permeation velocity Vmax of the ink, of the two or more inks, which exhibits the maximum permeation velocity and a minimum permeation velocity Vmin of the ink, of the two or more inks, which exhibits the minimum permeation velocity is not less than 0.6 when the maximum and minimum permeation velocities of the inks are determined by developing the inks with paper chromatography on a prescribed paper, respectively.

10. The method for producing the ink set for ink-jet recording according to claim 9, wherein the water-soluble organic solvent is a glycol-based ether, and the permeation velocities of the respective inks are controlled by controlling blending amounts of the glycol-based ether to be added to the respective inks.

11. The method for producing the ink set for ink-jet recording according to claim 9, wherein when a yellow ink is prepared, a nonionic surfactant is added to the yellow ink.

12. The method for producing the ink set for ink-jet recording according to claim 9, the two or more inks include a yellow ink and a black ink, and the yellow ink and the black ink are blended respectively so that a ratio (Vs/Vb) between Vs and Vb is not less than 0.75 provided that Vs represents a smaller permeation velocity of a permeation velocity of the yellow ink and a permeation velocity of the black ink, and Vb represents a larger permeation velocity.

* * * * *

UNITED STATES PATENT AND TRADEMARK OFFICE
CERTIFICATE OF CORRECTION

PATENT NO. : 6,966,943 B2
DATED : November 22, 2005
INVENTOR(S) : Hideto Yamazaki It is certified that error appears in the above-identified patent and that said Letters Patent is hereby corrected as shown below:

Title page,
Item [73], Assignee, should read -- Brother Kogyo Kabushiki Kaisha, Nagoya (JP) --.

Signed and Sealed this

Seventh Day of March, 2006

JON W. DUDAS
*Director of the United States Patent and Trademark Office*